United States Patent
Chiba et al.

(10) Patent No.: US 12,132,238 B2
(45) Date of Patent: Oct. 29, 2024

(54) FUEL CELL SYSTEM

(71) Applicant: HONDA MOTOR CO., LTD., Tokyo (JP)

(72) Inventors: Yutaka Chiba, Wako (JP); Seiji Sugiura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 522 days.

(21) Appl. No.: 17/671,701

(22) Filed: Feb. 15, 2022

(65) Prior Publication Data
US 2022/0311034 A1 Sep. 29, 2022

(30) Foreign Application Priority Data
Mar. 23, 2021 (JP) .................. 2021-048366

(51) Int. Cl.
H01M 8/04992 (2016.01)
H01M 4/88 (2006.01)
H01M 4/92 (2006.01)

(52) U.S. Cl.
CPC ..... H01M 8/04992 (2013.01); H01M 4/8882 (2013.01); H01M 4/921 (2013.01); H01M 4/926 (2013.01); H02J 2300/30 (2020.01)

(58) Field of Classification Search
CPC .......... H01M 8/04992; H01M 4/8882; H01M 4/921; H01M 4/926; H02J 2300/30
USPC ....................................... 320/101
See application file for complete search history.

(56) References Cited

U.S. PATENT DOCUMENTS

| | | | |
|---|---|---|---|
| 2009/0023022 A1* | 1/2009 | Katsumata | H01M 8/04552 429/408 |
| 2009/0110968 A1* | 4/2009 | Ulrike | H01M 8/04798 429/404 |
| 2011/0064976 A1 | 3/2011 | Shimoda | |
| 2016/0211538 A1 | 7/2016 | Agnew | |

(Continued)

FOREIGN PATENT DOCUMENTS

| | | |
|---|---|---|
| CN | 102019859 A | 4/2011 |
| CN | 105518962 A | 4/2016 |

(Continued)

OTHER PUBLICATIONS

Office Action dated Mar. 22, 2024 issued in the corresponding Chinese Patent Application No. 202210183407.7 with the English machine translation thereof.

*Primary Examiner* — Phallaka Kik
(74) *Attorney, Agent, or Firm* — Carrier, Shende & Associates P.C.; Joseph P. Carrier; Fulchand P. Shende

(57) ABSTRACT

A fuel cell system includes a first fuel cell having an electrode area made of first electrode material, and a second fuel cell having an electrode area made of second electrode material having low durability against output voltage variation in comparison with the first electrode material. The fuel cell system is configured to supply electrical power to a motor generator. The fuel cell system includes a required electrical power acquisition unit configured to obtain required electrical power of the motor generator, and a control unit configured to control the second fuel cell in a manner that a variation of output electrical power of the second fuel cell becomes not more than a predetermined limit variation, and control the first fuel cell in accordance with the required electrical power and output electrical power of the second fuel cell.

9 Claims, 6 Drawing Sheets

(56) References Cited

U.S. PATENT DOCUMENTS

| | | | | |
|---|---|---|---|---|
| 2018/0198145 A1* | 7/2018 | Watanabe | ............... | B60L 58/40 |
| 2019/0275912 A1* | 9/2019 | Tsuruta | .................. | B60L 58/40 |
| 2020/0067117 A1* | 2/2020 | Ito | ........................... | B60L 58/30 |

FOREIGN PATENT DOCUMENTS

| | | | | | |
|---|---|---|---|---|---|
| DE | 102019117255 A1 | * | 2/2020 | .............. | B60L 58/30 |
| JP | 2005019372 A | * | 1/2005 | ........ | H01M 8/04604 |
| JP | 2006-351336 A | | 12/2006 | | |
| JP | 2008-130424 A | | 6/2008 | | |
| JP | 2011181198 A | * | 9/2011 | ............. | Y02E 60/50 |
| JP | 2012129069 A | * | 7/2012 | ............. | Y02E 60/50 |
| JP | 2020-031030 A | | 2/2020 | | |
| KR | 20100060021 A | * | 6/2010 | .......... | H01M 8/0438 |
| WO | WO-2005006478 A1 | * | 1/2005 | ........ | H01M 8/04604 |

* cited by examiner

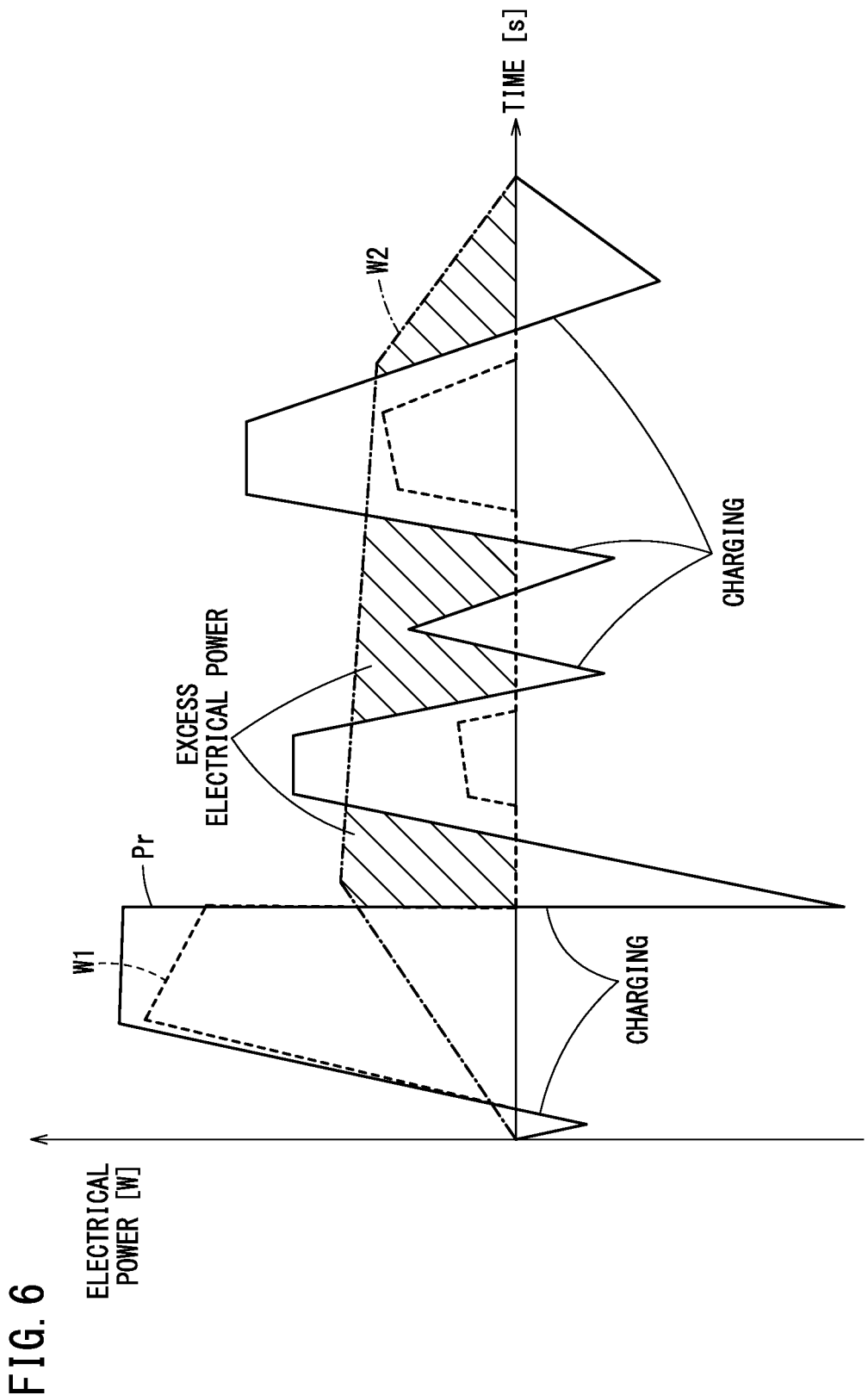

FUEL CELL SYSTEM

CROSS-REFERENCE TO RELATED APPLICATIONS

This application is based upon and claims the benefit of priority from Japanese Patent Application No. 2021-048366 filed on Mar. 23, 2021, the contents of which are incorporated herein by reference.

BACKGROUND OF THE INVENTION

Field of the Invention

The present invention relates to a fuel cell system for supplying electrical power to a load.

Description of the Related Art

JP 2020-031030 A discloses a fuel cell system. The fuel cell system includes a plurality of fuel cells each having different maximum output electrical power, and controls power generation of each fuel cell in accordance with the required output electrical power.

SUMMARY OF THE INVENTION

The technique described in JP 2020-031030 A aims to improve the durability of a fuel cell system including a plurality of fuel cells each having different maximum output electrical power. In the case where the plurality of fuel cells of the fuel cell system have electrode areas each having different durability against the output electrical power variation, it is required to achieve both of the desired power generation performance and the desired durability of a fuel cell system.

An object of the present invention to solve the above problem.

According to an aspect of the present invention, a fuel cell system is provided. The fuel cell system includes a first fuel cell having an electrode area made of first electrode material and a second fuel cell having an electrode area made of second electrode material having low durability against output voltage variation in comparison with the first electrode material. The fuel cell system is configured to supply electrical power to a load. The fuel cell system further includes a required electrical power acquisition unit configured to obtain required electrical power of the load, and a control unit configured to control the second fuel cell in a manner that a variation of output electrical power of the second fuel cell becomes equal to or less than a predetermined limit variation, and control the first fuel cell in accordance with the required electrical power and output electrical power of the second fuel cell.

In the present invention, it is possible to achieve both of the desired power generation performance and the desired durability.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a time chart showing the output electrical power of the first fuel cell and the output electrical power of the second fuel cell.

DESCRIPTION OF THE INVENTION

First Embodiment

Figure 1:
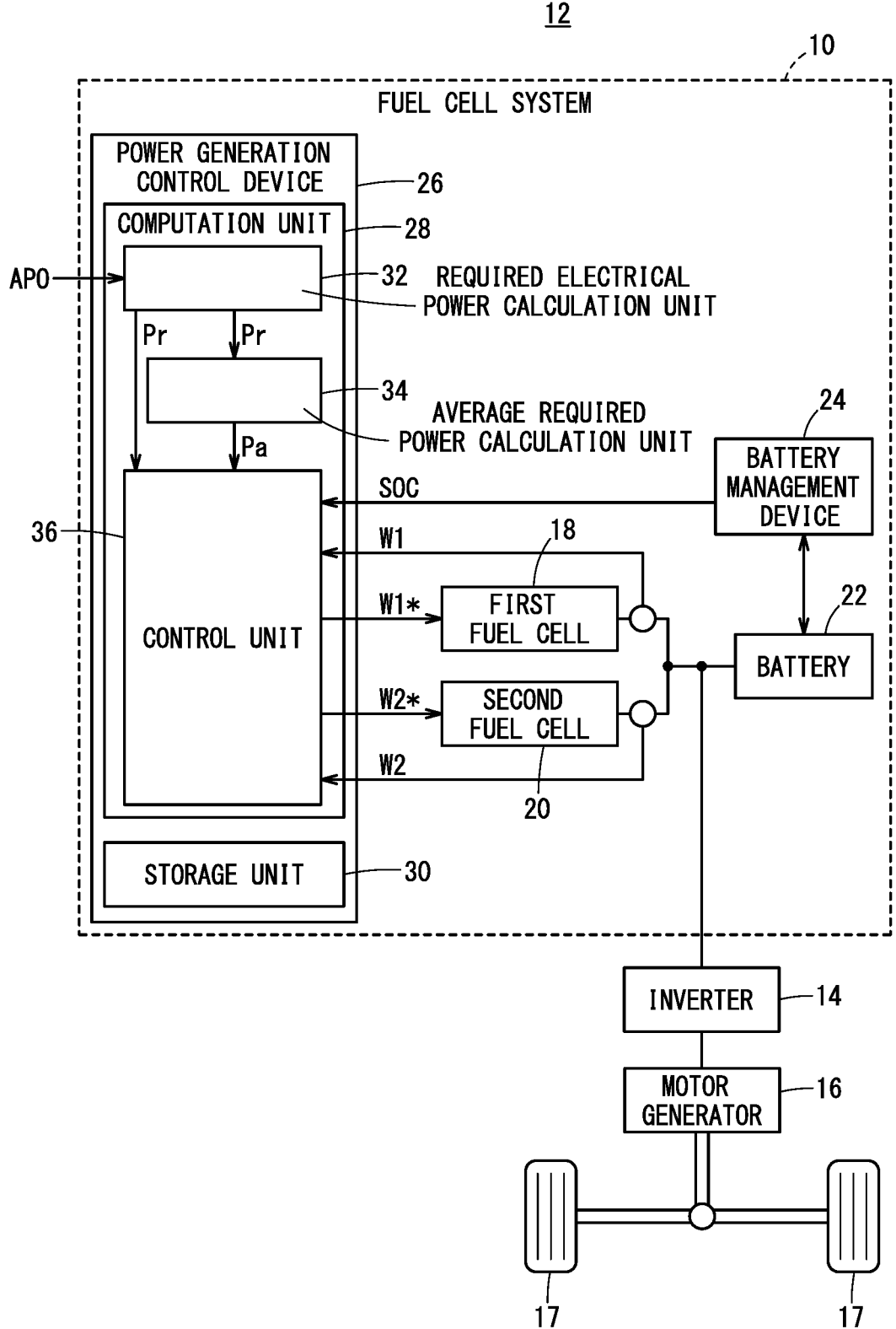
FIG. 1 is a system diagram showing a vehicle having a fuel cell system.

FIG. 1 is a system diagram showing a vehicle 12 having a fuel cell system 10. The fuel cell system 10 according to the embodiment of the present invention is used for a fuel cell vehicle or a fuel cell apparatus for stationary installment. The fuel cell system 10 is a power generation system that outputs electrical power in accordance with required electrical power Pr. The embodiment will be described in connection with a case where the fuel cell system 10 is mounted in the vehicle 12.

The vehicle 12 includes the fuel cell system 10, an inverter 14, and a motor generator 16. The electrical power outputted from the fuel cell system 10 is converted into alternating current electrical power by the inverter 14, and supplied to the motor generator 16. The motor generator 16 drives wheels 17 by consuming the supplied electrical power. The motor generator 16 corresponds to a load of the present invention.

The fuel cell system 10 includes a first fuel cell 18, a second fuel cell 20, a battery 22, a battery management device 24, and a power generation control device 26.

The first fuel cell 18 and the second fuel cell 20 are fuel cells that performs power generation consuming hydrogen and the air as reactant gases.

The first fuel cell 18 has an electrode area including a platinum alloy support catalyst using highly graphitized carbon as a carbon carrier for supporting platinum alloy. The second fuel cell 20 has an electrode area comprising a platinum alloy support catalyst using high specific surface area carbon as a carbon carrier for supporting platinum alloy. The highly graphitized carbon used as the carbon carrier of the embodiment of the present invention is produced by carbon powder subjected to heat treatment at a temperature range of 2700° C. to 2800° C. The high specific surface area carbon used as the carbon carrier of the embodiment of the present invention is produced by carbon powder subjected to heat treatment at a temperature range of 2400° C. to 2500° C. That is, in the embodiment of the present invention, heat treatment is applied to the highly graphitized carbon at high temperature in comparison with the high specific surface area carbon. Carbon powder may be carbon black.

Figure 2:
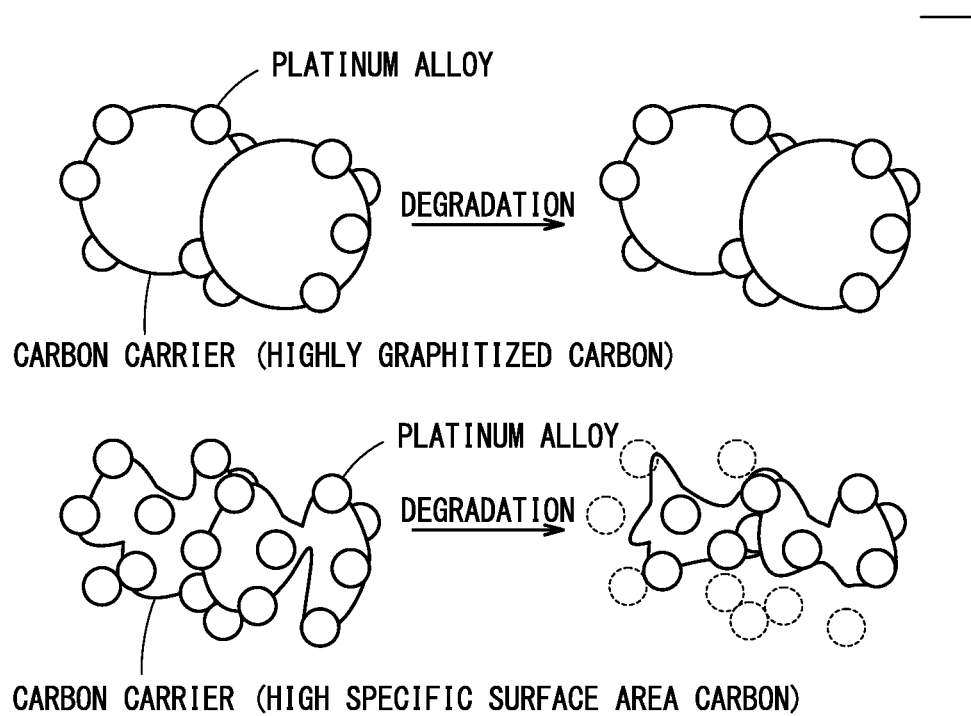
FIG. 2 is a view illustrating degradation of a carbon carrier.

FIG. 2 is a view illustrating degradation of a carbon carrier. The higher the heat the heat treatment temperature of the carbon powder becomes, the better the corrosion resistance of the carbon powder becomes. However, the specific surface area of the carbon powder is decreased. On the other hand, the lower the heat treatment temperature of the carbon power becomes, the larger the specific surface area of the carbon power becomes. However, the carbon powder is not graphited sufficiently. Therefore, the corrosion resistance of the carbon powder becomes low.

The heat treatment temperature of the highly graphitized carbon is high in comparison with the high specific surface area carbon. Therefore, platinum alloy support catalyst where the highly graphitized carbon is used as the carbon carrier has a large grain size, and a low catalyst activity in comparison with the platinum alloy support catalyst where high specific surface area carbon is used as the carbon carrier. Further, in the case of the platinum alloy support catalyst where the high specific surface area carbon is used as the carbon carrier, the degradation speed of the carbon carrier is high in comparison with the platinum alloy support catalyst where the highly graphitized carbon is used as the carbon carrier, and it soon becomes impossible to support the platinum alloy.

That is, though the durability of the first fuel cell 18 is high, the power generation performance of the first fuel cell 18 is low. In contrast, though the power generation performance of the second fuel cell 20 is high, the durability of the second fuel cell 20 is low. In the fuel cell system 10 according to the embodiment of the present invention, using the first fuel cell 18 and the second fuel cell 20 in combination, it is possible to achieve the desired durability and the desired power generation performance of the fuel cell system 10 as a whole.

Highly graphitized carbon is a general term for carbon materials with a high degree of graphitization (graphite), and high specific surface area carbon is a general term for carbon materials with a large surface area per unit mass. Therefore, the heat treatment temperature of the highly graphitized carbons is not always higher than the heat treatment temperature of the high specific surface area carbons. Further, the highly graphitized carbons or high specific surface area carbons are not always powdery.

The battery 22 is a rechargeable secondary battery. The battery 22 supplies electrical power to the motor generator 16, and is charged using electrical power regenerated by the motor generator 16. Further, the battery 22 is charged using excess electrical power that has not been consumed by the motor generator 16, of the electrical power outputted from the first fuel cell 18 and the second fuel cell 20. The battery 22 corresponds to an energy storage unit of the present invention. The battery management device 24 manages the SOC that indicates the charge state of the battery 22, and performs charge/discharge control in a manner that the battery 22 is not overcharged or overdischarged.

The power generation control device 26 has a computation unit 28 and a storage unit 30. For example, the computation unit 28 is constituted by a processor, i.e., a processing circuit such as a CPU (Central Processing Unit) and a GPU (Graphics Processing Unit).

The computation unit 28 has a required electrical power calculation unit 32, an average required electrical power calculation unit 34, and a control unit 36. The required electrical power calculation unit 32, the average required electrical power calculation unit 34, and the control unit 36 are realized by executing programs stored in the storage unit 30 by the computation unit 28.

At least part of the required electrical power calculation unit 32, the average required electrical power calculation unit 34, and the control unit 36 may be constituted by an integrated circuit such as an ASIC (Application Specific Integrated Circuit) and an FPGA (Field-Programmable Gate Array). Further, at least part of the required electrical power calculation unit 32, the average required electrical power calculation unit 34, and the control unit 36 may be constituted by an electronic circuit including discrete devices.

The required electrical power calculation unit 32 calculates the required electrical power Pr based on the accelerator pedal opening degree APO. The required electrical power Pr may be calculated outside the fuel cell system 10, and the calculated required electrical power Pr may be inputted to the power generation control device 26. The required electrical power calculation unit 32 corresponds to the required electrical power acquisition unit of the present invention. The average required electrical power calculation unit 34 calculates the time average of the required electrical power Pr in a predetermined period as the average required electrical power Pa.

The control unit 36 computes first command electrical power W1* and second command electrical power W2* based on the required electrical power Pr and the average required electrical power Pa, and the battery SOC transmitted from the battery management device 24. The first command electrical power W1* is a command value of the power generation electrical power of the first fuel cell 18. The second command electrical power W2* is a command value of the power generation electrical power of the second fuel cell 20. Further, the control unit 36 controls the first fuel cell 18 in a manner that the output electrical power W1 of the first fuel cell 18 becomes the first command electrical power W1* and controls the second fuel cell 20 in a manner that the output electrical power W2 of the second fuel cell 20 becomes the second command electrical power W2*.

The storage unit 30 may be made up of a volatile memory (not shown) and a non-volatile memory (not shown). Examples of the volatile memory includes a RAM (Random Access Memory). This volatile memory is used as a working memory of a processor, and temporarily stores data, etc. required for processing or computation by the processor. Examples of the non-volatile memory include a ROM (Read Only Memory), a flash memory, etc. This non-volatile memory is used as a storage memory, and stores programs, tables, maps, etc. At least part of the storage unit 30 may be provided in the above described processor, integrated circuit, or the like.

[Power Generation Control Process]

Figure 3:
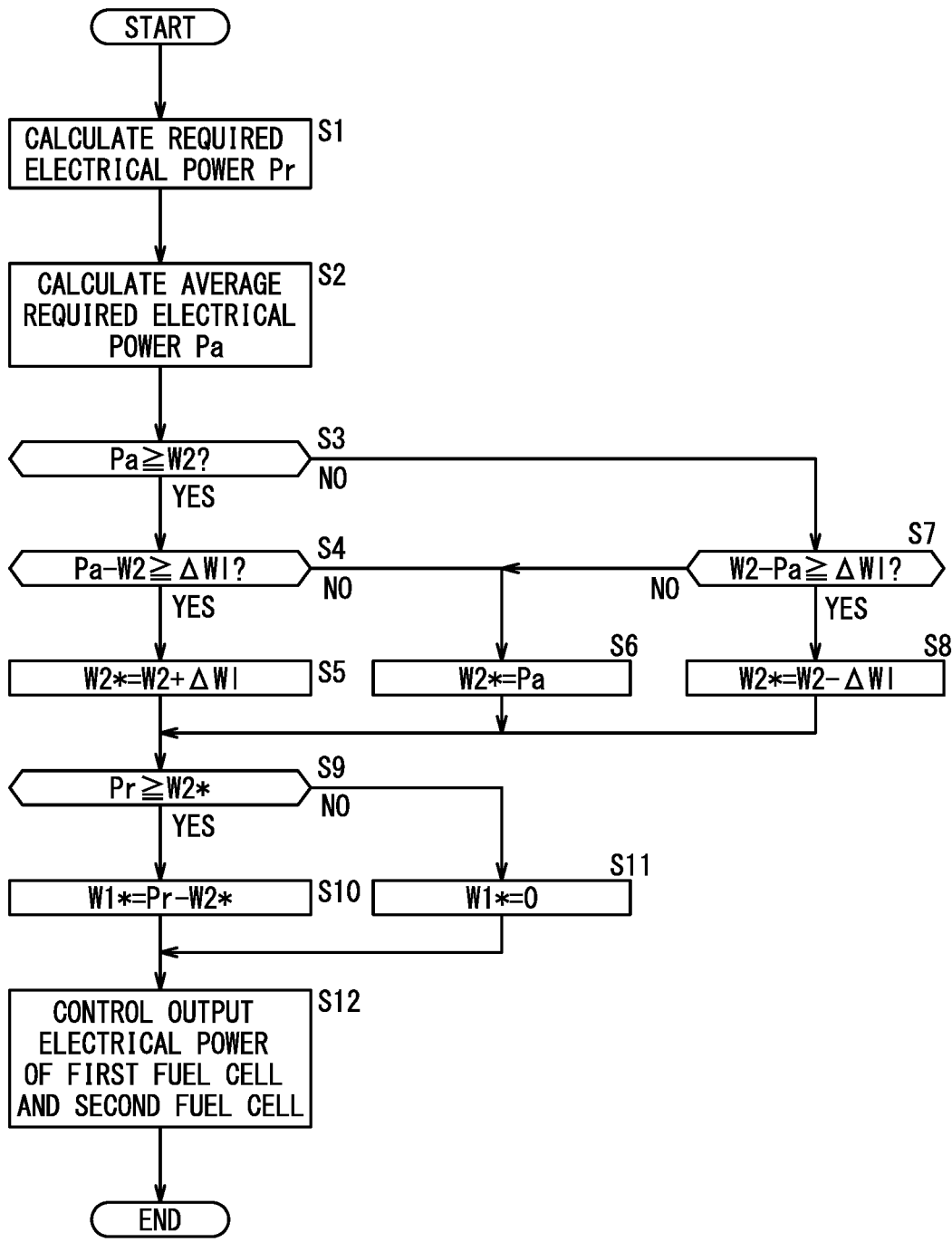
FIG. 3 is a flow chart showing a power generation control process performed by a power generation control device.

FIG. 3 is a flow chart showing the flow of a power generation control process performed by the power generation control device 26. While the start-up switch of the vehicle 12 is in the ON state, the power generation control process is performed repeatedly at a predetermined cycle.

In step S1, the required electrical power calculation unit 32 calculates the required power generation electrical power Pr based on the accelerator pedal opening degree APO, and the routine proceeds to step S2.

In step S2, the average required electrical power calculation unit 34 calculates a time average of the required electrical power Pr in the predetermined period as the average required electrical power Pa, and the routine proceeds to step S3.

In step S3, the control unit 36 determines whether or not the average required electrical power Pa is equal to or more than the output electrical power W2 of the second fuel cell 20. If the average required electrical power Pa is equal to or more than the output electrical power W2, the routine proceeds to step S4, and if the average required electrical power Pa is less than the output electrical power W2, the routine proceeds to step S7.

In step S4, the control unit 36 determines whether or not the difference between the average required electrical power Pa and the current output electrical power W2 of the second fuel cell 20 is equal to or more than the limit variation $\Delta W1$. If the difference between the average required electrical power Pa and the output electrical power W2 is not less than the limit variation $\Delta W1$, the routine proceeds to step S5. If the difference between the average required electrical power Pa and the output electrical power W2 is less than the limit variation $\Delta W1$, the routine proceeds to step S6.

In step S5, the control unit 36 sets the second command electrical power W2* to the sum of the current output electrical power W2 of the second fuel cell 20 and the limit variation $\Delta W1$, and the routine proceeds to step S9.

In step S6, the control unit 36 sets the second command electrical power W2* to the average required electrical power Pa, and the routine proceeds to step S9.

In step S7, the control unit 36 determines whether or not the difference between the current output electrical power W2 of the second fuel cell 20 and the average required electrical power Pa is equal to or more than the limit variation $\Delta W1$. If the difference between the output electrical power W2 and the average required electrical power Pa is equal to or more than the limit variation $\Delta W1$, the routine proceeds to step S8, and if the difference between the output electrical power W2 and the average required electrical power Pa is less than the limit variation $\Delta W1$, the routine proceeds to step S6.

In step S8, the control unit 36 sets the second command electrical power W2* to the difference between the current output electrical power W2 of the second fuel cell 20 and the limit variation $\Delta W1$, and the routine proceeds to step S9.

In step S9, the control unit 36 determines whether or not the required electrical power Pr is equal to or more than the second command electrical power W2*. If the required electrical power Pr is equal to or more than the second command electrical power W2*, the routine proceeds to step S10, and if the required electrical power Pr is less than the second command electrical power W2*, the routine proceeds to step S11.

In step S10, the control unit 36 sets the difference between the required electrical power Pr and the second command electrical power W2* to the first command electrical power W1*, and the routine proceeds to step S12.

In step S11, the control unit 36 sets the first command electrical power W1* to 0 [W], and the routine proceeds to step S12.

In step S12, the control unit 36 controls the first fuel cell 18 in a manner that the output electrical power W1 of the first fuel cell 18 becomes the first command electrical power W1* and controls the second fuel cell 20 in a manner that the output electrical power W2 of the second fuel cell 20 becomes the second command electrical power W2*, and finishes the power generation control process.

Although the control unit 36 sets the second command electrical power W2* based on the average required electrical power Pa, the control unit 36 may set the second command electrical power W2* based on the required electrical power Pr instead of the average required electrical power Pa.

Operation and Advantages

Figure 4:
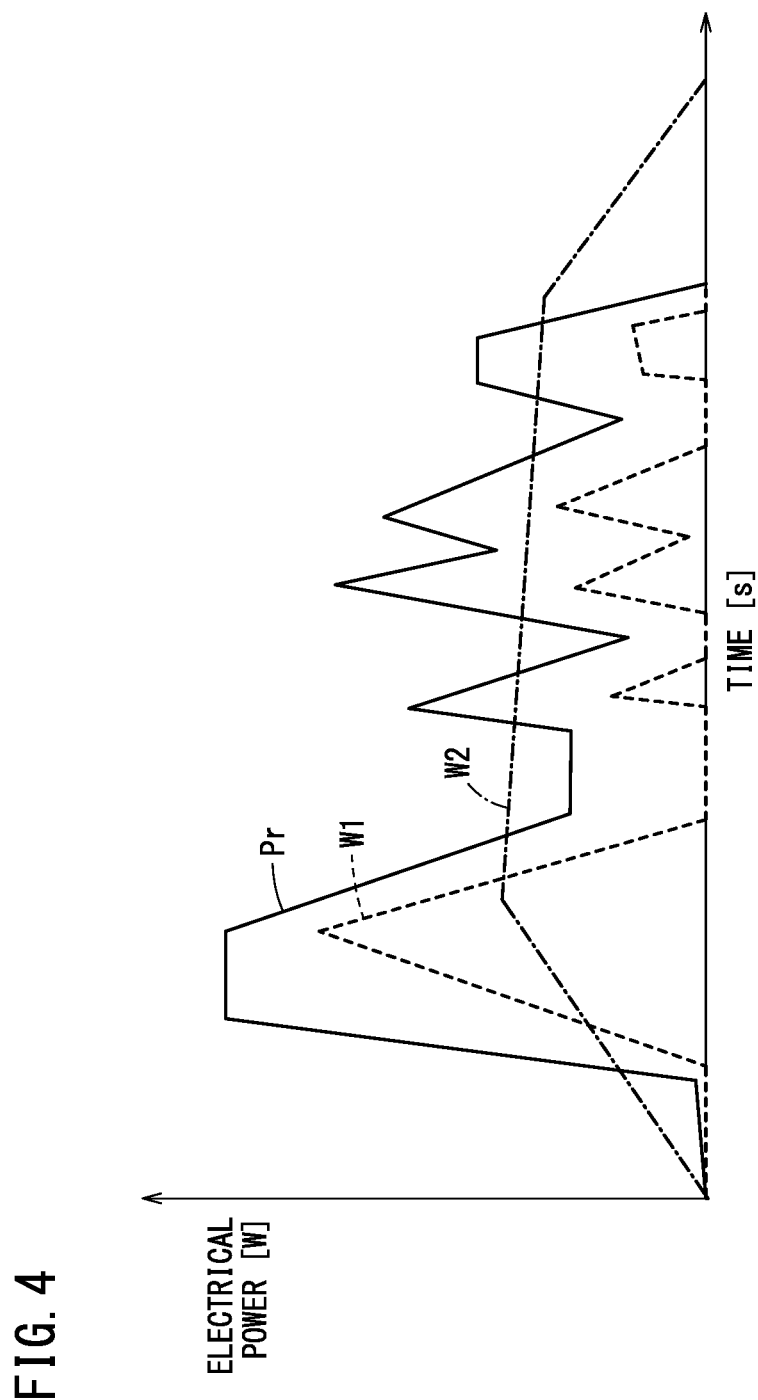
FIG. 4 is a time chart showing the required electrical power, the output electrical power of a first fuel cell, and the output electrical power of a second fuel cell.

FIG. 4 is a time chart showing the required electrical power Pr, the output electrical power W1 of the first fuel cell 18, and the output electrical power W2 of the second fuel cell 20. FIG. 4 is shows an image of changes over time, of the required electrical power Pr, the output electrical power W1 of the first fuel cell 18, and the output electrical power W2 of the second fuel cell 20.

In the embodiment, the control unit 36 sets the second command electrical power W2* in a manner that a variation of the output electrical power W2 of the second fuel cell 20 becomes equal to or less than the limit variation $\Delta W1$ to control the second fuel cell 20. Then, the control unit 36 controls the first fuel cell 18 in a manner that makes up for shortfalls of electrical power in the output electrical power W2 of the second fuel cell 20 with respect to the required electrical power Pr. In this way, it is possible to not only fulfill part of the required electrical power Pr with the output electrical power W2 of the second fuel cell 20 having the high power generation performance, but also suppress variation of the output electrical power W2 of the second fuel cell 20 so as to suppress degradation of the electrode area of the second fuel cell 20. Therefore, the output electrical power W1 of the first fuel cell 18 can make up for a time variation of the required electrical power Pr. Therefore, it is possible to achieve both of the desired durability and the desired power generation performance of the fuel cell system 10 as a whole.

Further, in the embodiment of the present invention, the control unit 36 sets the second command electrical power W2* based on the average required electrical power Pa. Because a variation of the average required electrical power Pa is smaller than a variation of the required electrical power Pr, the variation of the second command electrical power W2* can also be lowered.

Further, in the case where the current output electrical power W2 of the second fuel cell 20 is smaller than the average required electrical power Pa, the control unit 36 sets the second command electrical power W2* to the sum of the current output electrical power W2 of the second fuel cell 20 and the limit variation $\Delta W1$. In this manner, it is possible to gradually increase the output electrical power W2 of the second fuel cell 20 by the limit variation $\Delta W1$.

Further, in the case where the current output electrical power W2 of the second fuel cell 20 is larger than the average required electrical power Pa, the control unit 36 sets the second command electrical power W2* to the difference between the current output electrical power W2 of the second fuel cell 20 and the limit variation $\Delta W1$. In this manner, it is possible to gradually decrease the output electrical power W2 of the second fuel cell 20 by the limit variation $\Delta W1$.

Second Embodiment

In the second embodiment of the present invention, the battery 22 is charged with the excess electrical power in excess of the output electrical power W1 of the first fuel cell 18 and the output electrical power W2 of the second fuel cell 20 with respect to the required electrical power Pr.

[Power Generation Control Process]

Figure 5:
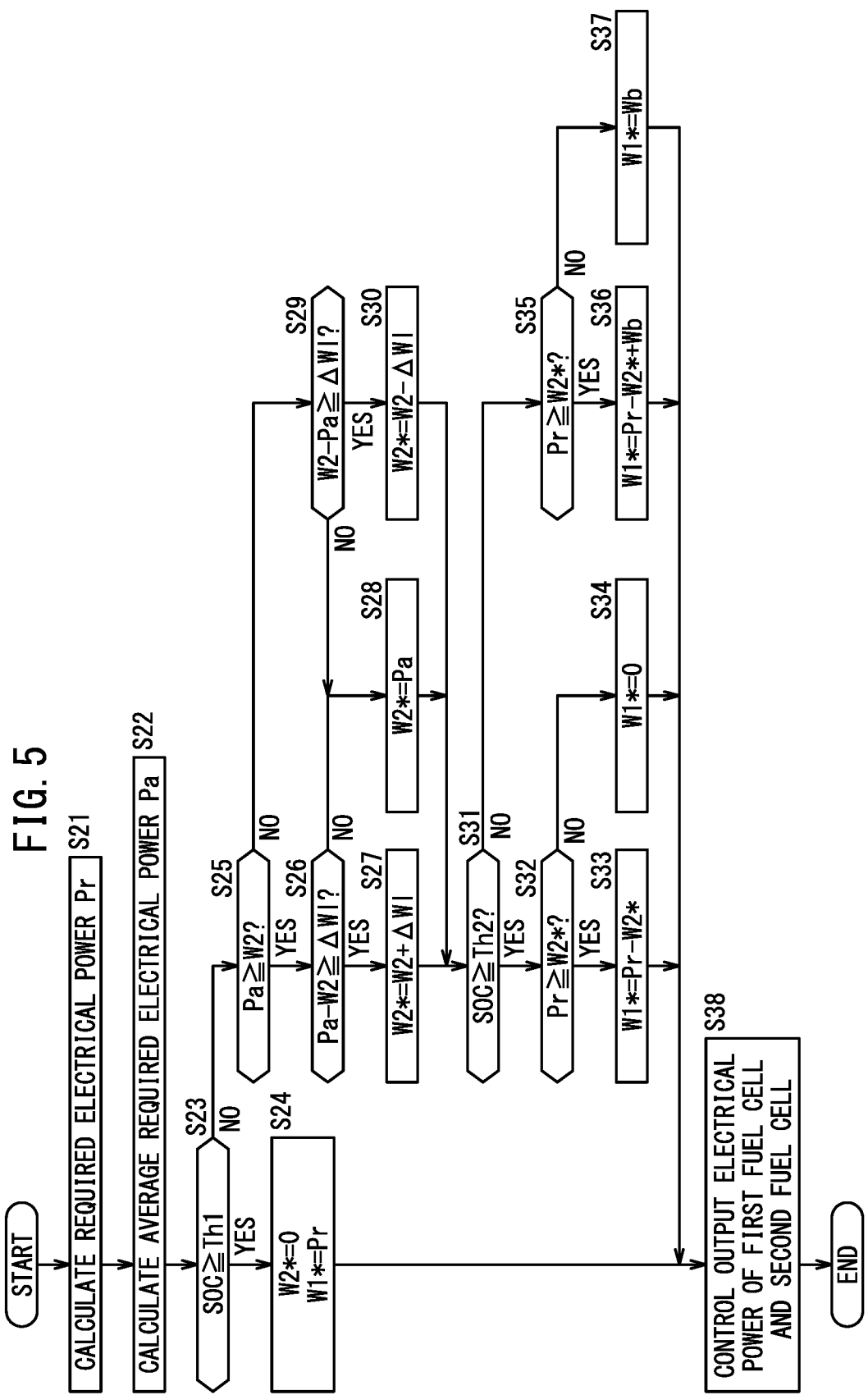
FIG. 5 is a flow chart showing flow of the power generation control process performed by the power generation control device.

FIG. 5 is a flow chart showing the flow of the power generation control process performed by the power generation control device 26. While the start-up switch of the vehicle 12 is in the ON state, the power generation control process is performed repeatedly at a predetermined cycle.

In step S21, the required electrical power calculation unit 32 calculates the required electrical power Pr based on the accelerator pedal opening degree APO, and the routine proceeds to step S22.

In step S22, the average required electrical power calculation unit 34 calculates the time average of the required electrical power Pr over the predetermined period as the average required electrical power Pa, and the routine proceeds to step S23.

In step S23, the control unit 36 determines whether or not the SOC of the battery 22 is equal to or more than a first threshold value Th1. If the SOC of the battery 22 is equal to or more than the first threshold value Th1, the routine proceeds to step S24. If the SOC of the battery 22 is less than the first threshold value Th1, the routine proceeds to step S25. The state where the SOC of the battery 22 is equal to or more than the first threshold value Th1 indicates the state where the charge level of the battery 22 is high, and the battery 22 cannot be charged to avoid overcharge.

In step S24, the control unit 36 sets the second command electrical power W2* to 0 [W], sets the first command electrical power W1* to the required electrical power Pr, and the routine proceeds to step S38.

In step S25, the control unit 36 determines whether or not the average required electrical power Pa is equal to or more than the current output electrical power W2 of the second fuel cell 20. If the average required electrical power Pa is equal to or more than the output electrical power W2, the routine proceeds to step S26, and if the average required electrical power Pa is less than the output electrical power W2, the routine proceeds to step S29.

In step S26, the control unit 36 determines whether or not the difference between the average required electrical power Pa and the current output electrical power W2 of the second fuel cell 20 is equal to or more than the limit variation ΔW1. If the difference between the average required electrical power Pa and the output electrical power W2 is equal to or more than the limit variation ΔW1, the control proceeds to step S27, and if the difference between the average required electrical power Pa and the output electrical power W2 is less than the limit variation ΔW1, the control proceeds to step S28.

In step S27, the control unit 36 sets the second command electrical power W2* to the sum of the current output electrical power W2 of the second fuel cell 20 and the limit variation ΔW1, and the routine proceeds to step S31.

In step S28, the control unit 36 sets the second command electrical power W2* to the average required electrical power Pa, and the routine proceeds to step S31.

In step S29, the control unit 36 determines whether or not the difference between the current output electrical power W2 of the second fuel cell 20 and the average required electrical power Pa is equal to or more than the limit variation ΔW1. If the difference between the output electrical power W2 and the average required electrical power Pa is equal to or more than the limit variation ΔW1, the routine proceeds to step S30, and if the difference between the output electrical power W2 and the average required electrical power Pa is less than the limit variation ΔW1, the routine proceeds to step S28.

In step S30, the control unit 36 sets the second command electrical power W2* to the difference between the current output electrical power W2 of the second fuel cell 20 and the limit variation ΔW1, and the routine proceeds to step S31.

In step S31, the control unit 36 determines whether or not the SOC of the battery 22 is equal to or more than the second threshold value Th2. If the SOC of the battery 22 is equal to or more than the second threshold value Th2, the routine proceeds to step S32. If the SOC of the battery 22 is less than the second threshold value Th2, the routine proceeds to step S35. The second threshold value Th2 is smaller than the first threshold value Th1. The state where the SOC of the battery 22 is equal to or more than the second threshold value Th2 and less than the first threshold value Th1 indicates the state where the charge level of the battery 22 is medium, and the battery 22 can still be charged since there is room to fully charge the battery 22. The state where the SOC of the battery 22 is less than the second threshold value Th2 indicates the state where the charge level of the battery 22 is low, and the battery 22 needs to be charged to avoid overdischarge.

In step S32, the control unit 36 determines whether or not the required electrical power Pr is equal to or more than the second command electrical power W2*. If the required electrical power Pr is equal to or more than the second command electrical power W2*, the routine proceeds to step S33, and if the required electrical power Pr is less than the second command electrical power W2*, the routine proceeds to step S34.

In step S33, the control unit 36 sets the difference between the required electrical power Pr and the second command electrical power W2* to the first command electrical power W1*, and the routine proceeds to step S38.

In step S34, the control unit 36 sets the first command electrical power W1* to 0 [W], and the routine proceeds to step S38.

In step S35, the control unit 36 determines whether or not the required electrical power Pr is equal to or more than the second command electrical power W2*. If the required electrical power Pr is equal to or more than the second command electrical power W2*, the routine proceeds to step S36, and if the required electrical power Pr is less than the second command electrical power W2*, the routine proceeds to step S37.

In step S36, the control unit 36 sets a value obtained by adding charging electrical power Wb to the difference between the required electrical power Pr and the second command electrical power W2* to the first command electrical power W1*, and the routine proceeds to step S38.

In step S37, the control unit 36 sets the charging electrical power Wb to the first command electrical power W1*, and the routine proceeds to step S38.

In step S38, the control unit 36 controls the first fuel cell 18 in a manner that the output electrical power W1 of the first fuel cell 18 becomes the first command electrical power W1* and controls the second fuel cell 20 in a manner that the output electrical power W2 of the second fuel cell 20 becomes the second command electrical power W2*, and finishes the power generation control process.

Operation and Advantages

FIG. 6 is a time chart showing the required electrical power Pr, the output electrical power W1 of the first fuel cell 18, and the output electrical power W2 of the second fuel cell 20. FIG. 6 shows an image of time change of the required electrical power Pr, the output electrical power W1 of the first fuel cell 18, and the output electrical power W2 of the second fuel cell 20.

In the embodiment of the present invention, of the output electrical power W1 of the first fuel cell 18 and the output electrical power W2 of the second fuel cell 20, the excess electrical power larger than the required electrical power Pr is supplied to the battery 22. In this manner, the excess electrical power is not discarded but is stored in the battery 22. In the case where the fuel cell system 10 is used in the fuel cell apparatus for stationary installment, the excess electrical power may be supplied to an electrical power network.

Further, in the embodiment of the present invention, in the state where the SOC of the battery 22 is high, the control unit 36 sets the second command electrical power W2* to 0 [W], and performs power generation only with the first fuel cell 18. In the case where the battery 22 cannot be charged, the output electrical power W1 of the first fuel cell 18 is changed in correspondence with the change of the required electrical power Pr so as not to generate the excess electrical power.

[Invention Obtained from the Embodiments]

The invention understood from the above embodiments will be described below.

The present invention provides the fuel cell system (10). The fuel cell system includes the first fuel cell (18) having an electrode area made of first electrode material, and the second fuel cell (20) having an electrode area made of second electrode material having low durability against output voltage variation in comparison with the first electrode material. The fuel cell system is configured to supply electrical power to the load (16). The fuel cell system further includes the required electrical power acquisition unit (32) configured to obtain required electrical power of the load, and the control unit (36) configured to control the second fuel cell in a manner that a variation of output electrical power of the second fuel cell becomes equal to or less than a predetermined limit variation, and control the first fuel cell in accordance with the required electrical power and output electrical power of the second fuel cell.

In the fuel cell system of the present invention, the control unit may be configured to control the first fuel cell in a manner that the output electrical power becomes a first command electrical power, control the second fuel cell in a manner that the output electrical power becomes a second command electrical power, and in a case where the second command electrical power is smaller than the required electrical power, set the difference between the required electrical power and the second command electrical power to the first command electrical power.

In the fuel cell system of the present invention, the control unit may be configured to control the first fuel cell in a manner that the output electrical power becomes a first command electrical power, control the second fuel cell in a manner that the output electrical power becomes a second command electrical power, and when the second command electrical power is larger than the required electrical power, set the first command electrical power to 0 [W], and supply excess electrical power, which is the difference between the second command electrical power and the required electrical power, to a component other than the load.

The fuel cell system of the present invention may include the energy storage unit (22), and the control unit may be configured to control the first fuel cell in a manner that the output electrical power becomes a first command electrical power, control the second fuel cell in a manner that the output electrical power becomes a second command electrical power, and set the difference between the required electrical power and the second command electrical power to the first command electrical power in a case where the energy storage unit has a charge level in a predetermined range and the second command electrical power is smaller than the required electrical power, and in a case where the second command electrical power is larger than the required electrical power, set the first command electrical power to 0 [W], and supply excess electrical power, which is the difference between the second command electrical power and the required electrical power, to the energy storage unit.

In the fuel cell system of the present invention, the control unit may be configured to, in a case where the charge level of the energy storage unit is higher than the predetermined range, set the second command electrical power to 0 [W], and set the first command electrical power to the required electrical power.

The fuel cell system of the present invention may include the average required electrical power calculation unit (34) configured to calculate, as the average required electrical power, the time average of the required electrical power over a predetermined period, and the control unit may be configured to set the second command electrical power to the average required electrical power, and in a case where the charge level of the energy storage unit is lower than the predetermined range and the second command electrical power is smaller than the required electrical power, add charge electrical power to the difference between the required electrical power and the second command electrical power to obtain the first command electrical power, and supply the charge electrical power to the energy storage unit, and in a case where the second command electrical power is larger than the required electrical power, set the first command electrical power to the charge electrical power, and supply to the energy storage unit the excess electrical power, which is the difference between the second command electrical power, and the charge electrical power.

In the fuel cell system of the present invention, in a case where the output electrical power of the second fuel cell is lower than the required electrical power, the control unit may gradually increase the output electrical power of the second fuel cell by the limit variation.

In the fuel cell system of the present invention, in the case where the output electrical power of the second fuel cell is higher than the required electrical power, the control unit may gradually decrease the output electrical power of the second fuel cell by the limit variation.

In the fuel cell system of the present invention, the first electrode material may be formed by platinum alloy support catalyst where platinum alloy is supported by a carbon carrier formed by carbon powder subjected to heat treatment in a temperature range of 2700° C. to 2800° C., and the second electrode material is formed by platinum alloy support catalyst where platinum alloy is supported by a carbon carrier formed by carbon powder subjected to heat treatment in a temperature range of 2400° C. to 2500° C.

The present invention is not limited to the above-described embodiment, and various modifications can be made without departing from the gist of the present invention.

What is claimed is:

1. A fuel cell system comprising:
   a first fuel cell having an electrode area made of first electrode material; and
   a second fuel cell having an electrode area made of second electrode material having low durability against output voltage variation in comparison with the first electrode material,
   the fuel cell system being configured to supply electrical power to a load,
   the fuel cell system further comprising:
   a required electrical power acquisition unit configured to obtain required electrical power of the load; and
   a control unit configured to control the second fuel cell in a manner that a variation of output electrical power of the second fuel cell becomes equal to or less than a predetermined limit variation, and control the first fuel cell in accordance with the required electrical power and output electrical power of the second fuel cell.

2. The fuel cell system according to claim 1, wherein the control unit is further configured to:
   control the first fuel cell in a manner that output electrical power becomes a first command electrical power;

control the second fuel cell in a manner that output electrical power becomes a second command electrical power; and in a case where the second command electrical power is smaller than the required electrical power, set a difference between the required electrical power and the second command electrical power to the first command electrical power.

3. The fuel cell system according to claim 1, wherein the control unit is further configured to:

control the first fuel cell in a manner that output electrical power becomes a first command electrical power;

control the second fuel cell in a manner that output electrical power becomes a second command electrical power; and in a case where the second command electrical power is larger than the required electrical power, set the first command electrical power to 0 [W], and supply excess electrical power, which is a difference between the second command electrical power and the required electrical power, to a component other than the load.

4. The fuel cell system according to claim 1, further comprising an energy storage unit, wherein the control unit is further configured to:

control the first fuel cell in a manner that output electrical power becomes a first command electrical power;

control the second fuel cell in a manner that output electrical power becomes a second command electrical power; and set a difference between the required electrical power and the second command electrical power to the first command electrical power in a case where the energy storage unit has a charge level in a predetermined range and the second command electrical power is smaller than the required electrical power; and in a case where the second command electrical power is larger than the required electrical power, set the first command electrical power to 0 [W], and supply excess electrical power, which is a difference between the second command electrical power and the required electrical power, to the energy storage unit.

5. The fuel cell system according to claim 4, wherein the control unit is further configured to:

in a case where the charge level of the energy storage unit is higher than the predetermined range, set the second command electrical power to 0 [W] and set the first command electrical power to the required electrical power.

6. The fuel cell system according to claim 4, further comprising an average required electrical power calculation unit configured to calculate, as average required electrical power, a time average of the required electrical power over a predetermined period, wherein the control unit is further configured to:

set the second command electrical power to the average required electrical power; and in a case where the charge level of the energy storage unit is lower than the predetermined range and the second command electrical power is smaller than the required electrical power, add charge electrical power to the difference between the required electrical power and the second command electrical power to obtain the first command electrical power, and supply the charge electrical power to the energy storage unit; and in a case where the second command electrical power is larger than the required electrical power, set the first command electrical power to the charge electrical power, and supply to the energy storage unit excess electrical power, which is the difference between the second command electrical power, and the charge electrical power.

7. The fuel cell system according to claim 1, wherein in a case where the output electrical power of the second fuel cell is lower than the required electrical power, the control unit gradually increases the output electrical power of the second fuel cell by the limit variation.

8. The fuel cell system according to claim 1, wherein in the case where the output electrical power of the second fuel cell is higher than the required electrical power, the control unit gradually decreases the output electrical power of the second fuel cell by the limit variation.

9. The fuel cell system according to claim 1, wherein the first electrode material is formed by platinum alloy support catalyst where platinum alloy is supported by a carbon carrier formed by carbon powder subjected to heat treatment in a temperature range of 2700° C. to 2800° C.; and the second electrode material is formed by platinum alloy support catalyst where platinum alloy is supported by a carbon carrier formed by carbon powder subjected to heat treatment in a temperature range of 2400° C. to 2500° C.

* * * * *